United States Patent [19]
Spooner et al.

[11] Patent Number: 5,542,316
[45] Date of Patent: Aug. 6, 1996

[54] CAM TYPE GEARLESS INTERAXLE DIFFERENTIAL MECHANISM

[75] Inventors: John Spooner; Alastair J. Young, both of Kenilworth; John P. Chippendale, Knowle, all of Great Britain

[73] Assignee: Automotive Products, plc, Leamington Spa, England

[21] Appl. No.: 256,284

[22] PCT Filed: Nov. 8, 1993

[86] PCT No.: PCT/GB93/02298

§ 371 Date: Jul. 6, 1994

§ 102(e) Date: Jul. 6, 1994

[87] PCT Pub. No.: WO94/11653

PCT Pub. Date: May 26, 1994

[30] Foreign Application Priority Data

Nov. 7, 1992 [GB] United Kingdom ............... 9223406

[51] Int. Cl.⁶ ........................... F16H 35/04; F16H 57/04
[52] U.S. Cl. ........................ 74/650; 184/6.12; 74/665 F
[58] Field of Search ........................ 74/650, 665 F; 184/6.12, 11.1, 11.2, 13.1

[56] References Cited

U.S. PATENT DOCUMENTS

| | | | |
|---|---|---|---|
| 2,106,946 | 2/1938 | Frederickson | 74/650 |
| 2,139,405 | 12/1938 | Frederickson | 74/650 |
| 2,651,214 | 9/1953 | Randall | 74/650 |
| 2,850,919 | 9/1958 | Wildhaber | 74/650 |
| 3,359,803 | 12/1967 | Long | 74/650 |
| 3,451,496 | 6/1969 | Myers | 74/650 |
| 3,529,698 | 9/1970 | Nelson | 184/6.12 |
| 4,128,021 | 12/1978 | Knowles | 74/650 |
| 4,327,950 | 5/1982 | Czuszak | 184/11.1 X |
| 5,062,320 | 11/1991 | Parsons et al. | 74/650 |
| 5,273,136 | 12/1993 | Martin et al. | 184/6.12 |

FOREIGN PATENT DOCUMENTS

| | | |
|---|---|---|
| 752997 | 7/1956 | United Kingdom . |
| 284329 | 7/1988 | United Kingdom . |
| 326289 | 8/1989 | United Kingdom . |
| 2232214 | 12/1990 | United Kingdom . |

*Primary Examiner*—Khoi Q. Ta
*Attorney, Agent, or Firm*—Paul E. Milliken; Lee A. Germain

[57] ABSTRACT

A differential mechanism having two output cam members rotatable about an axis, each cam member having a single annular cam surface of undulating form comprising pairs of mutually inclined surfaces. The inclined surfaces are engaged by end surfaces of followers so that relative contra rotation of the output cam members causes the cam followers to slide axially. An Input element engages and supports the followers and moves the followers circumferentially relative to the output cam members. The input element engages with a radially inner portion of each cam follower to move the follower circumferentially relative to the cam output members, and the cam surfaces are inclined away from the axis of rotation.

18 Claims, 3 Drawing Sheets

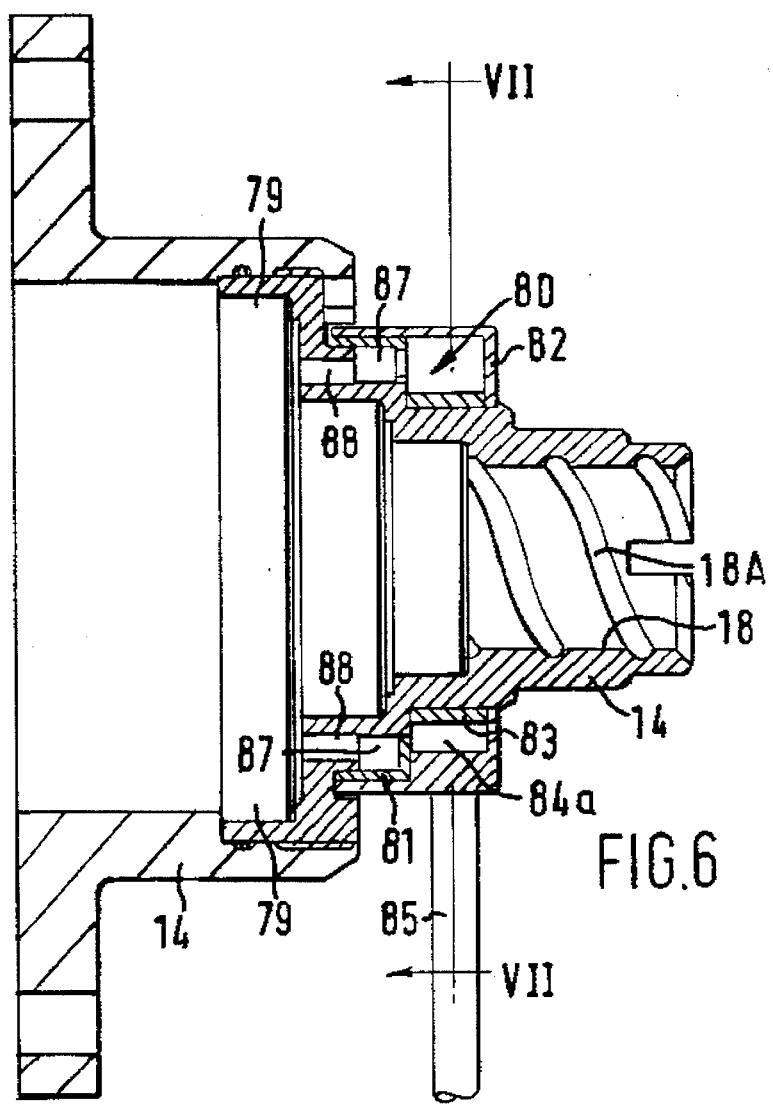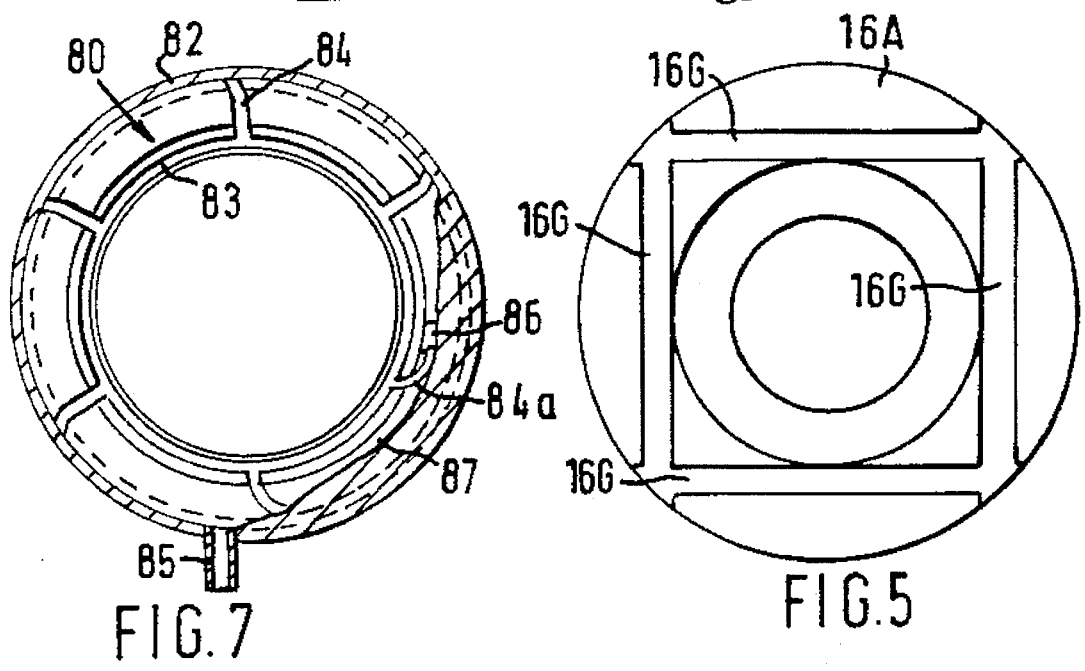

CAM TYPE GEARLESS INTERAXLE DIFFERENTIAL MECHANISM

The invention relates to a differential mechanism particularly but not exclusively for use in motor vehicles.

Differential mechanisms commonly used on vehicles are of the sun and planet gear type and have a well known disadvantage that when one wheel is on a slippery surface such as mud or ice and the other wheel is on a firm surface capable of providing traction, the first wheel will simply spin as it receives all the available power transmitted to the differential.

Limited slip differential mechanisms have been proposed in an attempt to overcome this problem which restrict the extent to which one wheel can spin relative to the other but such differentials are more complex and therefore, more costly to produce.

In European patent application EP-A-0284329 there is proposed an alternative differential mechanism comprising two output cam members rotatable about an axis, each said member having a single annular cam surface thereon of undulating form comprising pairs of mutually inclined surfaces, and a plurality of cam followers having end surfaces engaging the cam surfaces of the output cam members, the arrangement being such that relative contra rotation of said output cam members causes the cam followers to slide axially, and an input element engaging the followers which are slidably supported by the input element and moving the followers circumferentially relative to the output cam members.

Such a differential will hereinafter be called a differential of the type described.

It is an object of the present invention to provide a differential of the type described which is suitable for use in four wheel drive applications.

According to the invention there is provided a differential of the type described characterised in that the input element engages with a radially inner portion of each cam follower to move the follower circumferentially relative to the cam output members and the cam surfaces face inwardly towards the axis of rotation.

Preferably one output cam surface is formed on a housing containing the differential, and the second output cam surface is on a pinion which is rotatable within the housing.

Conveniently in a four wheel drive application the housing is drivably connected to the front wheels of the vehicle, and the pinion is drivably connected to the rear wheels of the vehicle.

Oil pump means may be provided, driven from a component of the differential which rotates during use of the differential to pump oil into the differential. The oil pump means may comprise external scoops or a vane type pump.

The invention will now be described by way of example with reference to the accompanying drawings in which.

Figure 1:
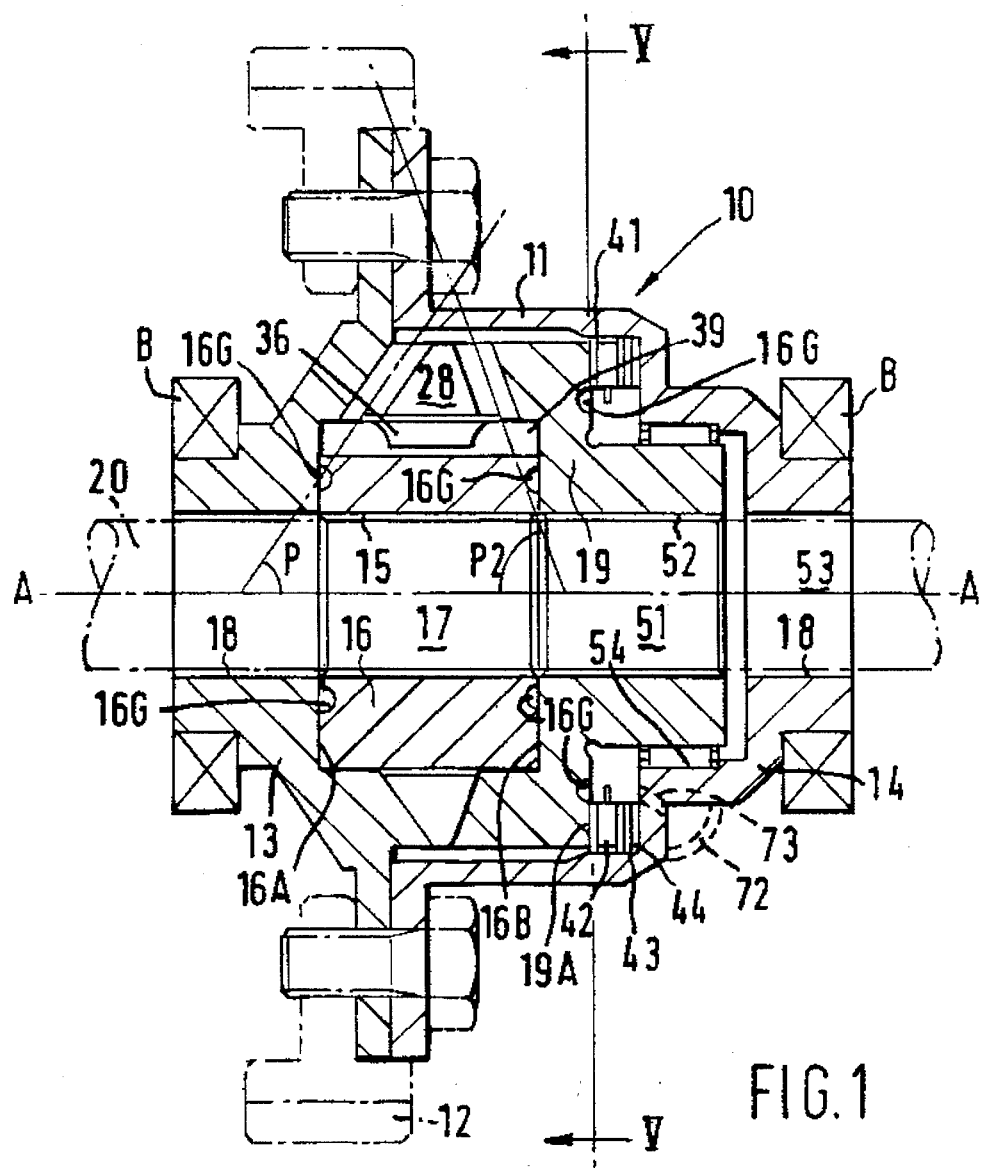
FIG. 1 is a cross section through a differential mechanism in accordance with the invention.
Figure 4:
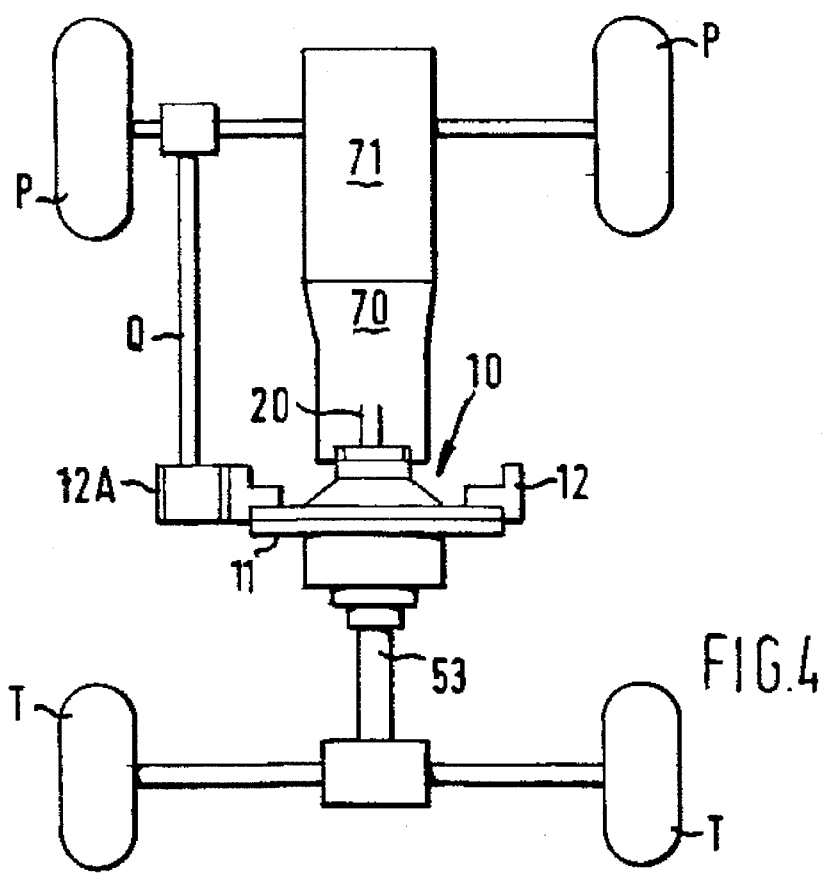

FIG. 4 diagrammatically shows the differential of FIG. 1 in use in a vehicle;

FIG. 5 is a view on line V—V of FIG. 1 showing lubrication grooving details;

FIG. 6 is a section through part of an alternative differential arrangement which include an oil pump, and FIG. 7 is a view on line VII—VII of FIG. 6 showing details of the pump housing and impellor.

Figure 2:
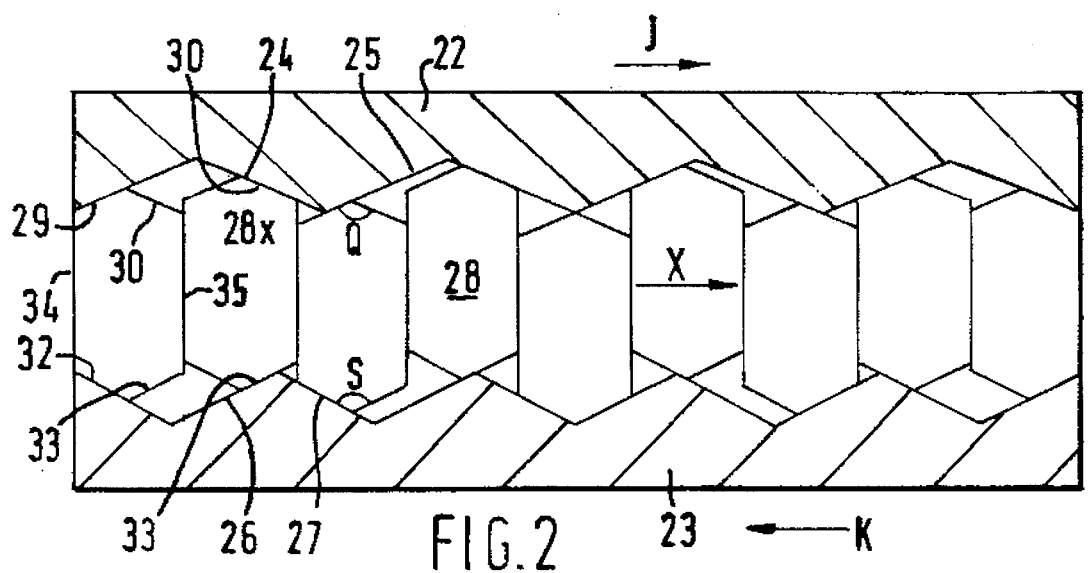
FIG. 2 is a development of cam surfaces with cam followers shown in positions therebetween.
Figure 3:
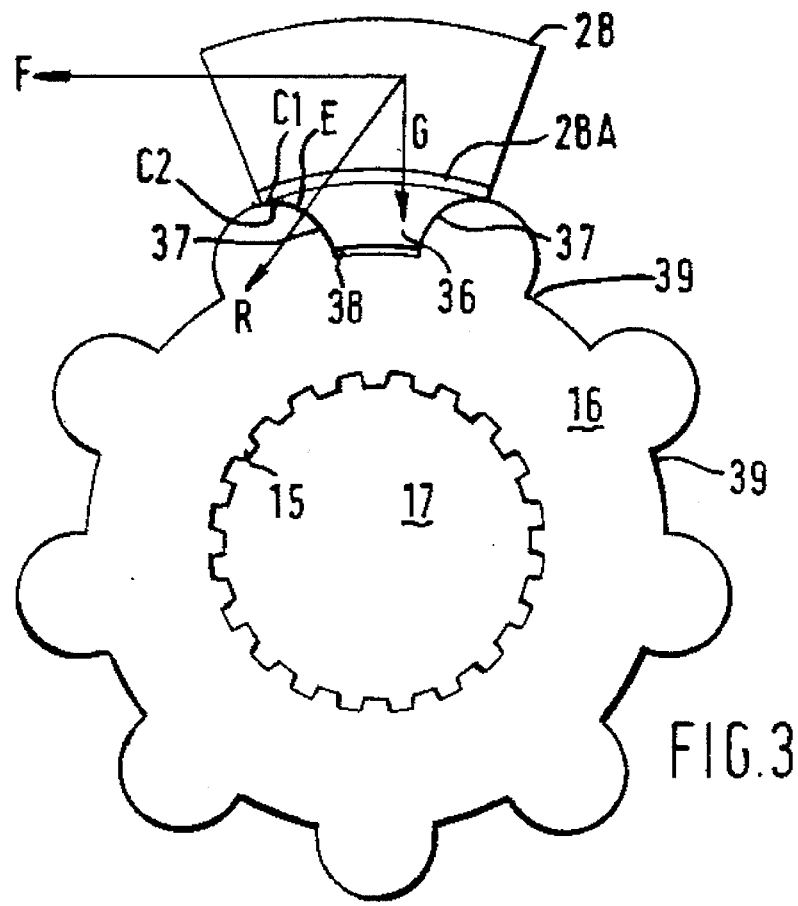
FIG. 3 is an end view of a cam follower and input member of the differential of FIG. 1.

In FIGS. 1 to 3 the differential 10 is mounted in a partially oil-filled surrounding casing (not shown) by bearings B. The differential 10 comprises a housing 11 formed by end walls 13 and 14 having a gear 12 on its external surface to provide a drive output in known manner. The end walls 13 and 14 may be, formed in two or more pieces (see FIG. 6 embodiment) the two pieces being screwed, welded and/or bolted together.

An input hub 16 is located within the centre of the housing 11. The input hub 16 has a central bore 17 with splines 15 therein for connection to an input shaft 20. An output pinion 19 is also located within the housing 11, and has a centre bore 51 with splines 52 for connection to an output shaft 53. The shafts 20 and 53 pass through bores 18 in the end walls 13 and 14. The bores 18 may each have a helical oil feed groove (not shown) on the inner surface thereof in use to feed lubrication from the casing (not shown) into the differential 10. The output pinion 19 is rotatable in bearings 54 about an axis A relative to the housing 11. The input shaft 20 is held concentric with axis A by a bearing in the gearbox 70 (see FIG. 4) for rotation relative to the housing 11.

The axially inner surface of the housing end wall 13, and the pinion 19 have respective cams 22, 23 thereon which comprise frustoconical undulating surfaces.

The cam 22 has an annular zigzag cam surface shown in detail in FIG. 2 made up from four pairs of mutually inclined helical surfaces 24, 25. The cam 23 also comprises an annular zigzag surface (apparent from FIG. 2) but is made up from five pairs of mutually inclined helical surfaces 26, 27. As shown in FIG. 1, the undulating cam surface 24, 25 of cam surface 22 is inclined at an angle P to the axis A and the undulating cam surface 26, 27 of cam 23 is inclined at angle P2 to the axis A, whereby the cam surfaces converge towards each other away from the axis A.

Nine cam followers 28 are positioned between the cams 22, 23. Each cam follower is of strut-like elongate form and comprises two sets off mutually inclined end surfaces 29, 30 and 32, 33 which terminate at relatively longer side surfaces 34, 35. The angle of inclination Q between the end surfaces 29, 30 corresponds to the angle of inclination between the cam surfaces 24, 25 and the angle of inclination S between the end surfaces 32, 33 corresponds to the angle of the inclination between the cam surfaces 26, 27. The end surfaces 29, 30 also face inwardly towards the axis A at angle P and the end surfaces 32, 33 face inwardly at angle P2 as apparent from FIG. 1. The angles P and P2 may be the same. When viewed from the end each cam follower is arcuate which enables the followers to be assembled together in a circle. Each cam follower has an arcuate embrace of substantially 360/nf degrees where nf is the number of cam followers. However, if desired the arcuate embrace may be less to leave clearance spaces between the followers.

Each cam follower 28 includes an elongate drive dog 36 having rounded side surfaces 37. The drive dogs 36 locate with slight clearance 38 in complementary shaped grooves 39 formed in the outer periphery of the cylindrical drive input hub 16. The clearance 38 is just sufficient to ensure that the arcuate inner periphery indicated at 28A) of each follower 28 can abut the outer peripheral/curved surface of the grooves 39. The grooves 39 provide support for the followers 28 at least adjacent their axial ends and preferably, as shown, for substantially their entire length.

As apparent from FIG. 2 and 3, the assembly of the cam followers is preferably such as to place the side surfaces 34,35 of adjacent followers so that they interengage or lie closely adjacent. In that way maximum use is made of the available circumferential space for the cam followers, the followers together forming a substantially continuous and compact annular array.

When driven input is applied through drive input hub 16 and assuming that a vehicle having the differential is being driven in a straight line, the cam followers 28 apply a load to the surfaces of cams 22, 23 so as to rotate the housing 11 and pinion 19 at equal speeds. As apparent from FIG. 2, with the driving load applied in the direction X, the cam follower 28X on the extreme left but one, has its end surfaces 30, 33 in driving engagement with surfaces 24, 26 and alternate followers are similarly in driving engagement with the cams 22, 23. However, intermediate cam followers have their surfaces in non-driving engagement with the cam surfaces 25, 27.

The driving force applied by the followers 28 to the inclined surfaces 24, 26 produces a reaction force F as illustrated in FIG. 3. The inclination of the end surfaces of the cam followers at angle P and P2 causes the application of forces to the cam followers, which are shown only for cam 22 having the angle P. The application of force F to follower 28 creates an inward force G thereby producing a resultant force R which passes through a radially inner curved edge E of a drive dog 36 to the right of corner C1 of the drive dog. In this way the loading on the cam follower tends to wedge it firmly against a rounded corner C2 of the drive input hub groove 39 in such a way that tipping of the follower about its edge C1 is avoided.

The differential effect can best be appreciated considering the driving hub 16 as being stationary and by applying contra rotary movement to the cams 22, 23 in direction J, K respectively in FIG. 2. The cam surfaces 26 will move to the left and cam surfaces 24 to the right. Such movement of the cam surface 26 causes the associated follower to move axially towards cam 22. If both cams 22, 23 and the drive hub 16 are all given an additional rotational movement in direction of arrow J, it will be appreciated that the cams 22 and 23 will be rotating respectively faster and slower than hub 16. The difference in speeds between the two cams 22, 23 and the drive input hub 16 will result from the different number of pairs of cam surfaces on the cams. As there is considerable amount of friction between the followers and the cams, torque will be transmitted to one cam even when the other is drivably connected to an axle with a wheel spinning on a slippery surface, which is highly advantageous over conventional differential systems. The moving of one axle faster than the other will result in a reduction in net torque applied to that axle through the associated cam due to the load applied by the axially moving cam followers to which input torque is applied. There will be, in that case, an increase in the net torque applied at the other cam and the ratio between the net torques will be dependent upon the values of the angles Q, S. The greater the angles, the greater will be the friction at the cam surfaces due to axial loading applied thereto by the followers. The angles Q, S are normally selected whereby the face cams may drive the cam followers axially but mere axial movement of the cam followers cannot drive the face cams. However, if desired, the angles Q, S can be selected to provide a degree of reversibility.

As mentioned above, the adjacent cam followers may be arranged with their side surfaces 34, 35 closely adjacent or in inter-engagement, driving force F applied to any follower 28 in non-driving engagement with cam surfaces may be arranged to transmit driving and applied thereto to the next driving follower through interengaging surfaces further inhibits the cam followers tipping relative to the cams.

Interengagement of the surface will take place over substantially their entire length. The torque ratio requirement between the two net torques of the inside and outside output shafts is higher in some applications than others. Where high torque ratios are required say from 3:1 to 5:1 this can cause problems with wear rates between the cam followers and the cam surfaces.

Axial thrust applied to the cams 22, 23 by the followers 28 is transmitted to the housing 11 through the back face 19A of the pinion 19 via the thrust washers 41 and needle bearings 42. Shims may be used to adjust the relative axial position of the pinion 19. A belleville washer 44 (shown compressed into a flat configuration in FIG. 1) may be arranged to act against a bearing washer 43 to urge the followers 28 into firm engagement with the cams 22, 23. The urging of the followers 28 against the cams 22, 23 also creates a radially inward force on the followers 28 resulting from the angles of inclination P and P2 which in addition helps to reduce backlash.

The needle bearings 42 could be replaced by thrust washers.

In FIG. 1 it can be seen that the angles of inclination to the axis A of the undulating cam surfaces of cams 22, 23 are different, the undulating cam surface 24, 25 of cam 22 being inclined at angle P and the undulating cam surface 26, 27 of cam 23 being inclined at angle P2. The cam followers 28 have similarly inclined end surfaces 29, 30 and 32, 33. The end surfaces 29, 30 are also mutually inclined at the same angle as helical surfaces 26, 27 of cam 23.

As the angle of inclination between the surfaces 24, 25 is different from that between surfaces 26, 27 the division of torque between the output drive connector to the cams 22, 23 will be different when the cam surfaces are turning relative to each other in one direction than when they are turning relatively in the opposite direction.

It has been found that appropriate selection of angles P and P2 can affect the ratio of torques transmitted to the drive. The ends of the cam follower 27, being inclined at different angles P and P2, also aids the correct assembly of the differential.

FIG. 4 shows the differential 10 mounted in a 4 wheel drive vehicle having a gear box 70 and a longitudially mounted engine 71. The gear box output shaft is connected with the input hub 16 via shaft 20 and the housing 11 drives the vehicle front wheels P through the gear 12 and a meshing gear 12A on a front wheel drive shaft Q. The rear wheels T are driven through the output shaft 53.

The pinion 19 may have axially extending oil lubricating passageways (not shown) formed in the internal surfaces of the central bore 51. These passageways could pass the whole length of the bore 51 and open into the splines 15.

A second set of oil lubricating passageways (not shown) connect the cam surface 26, 27 of cam 23 to the backface 19A of the pinion 19. These passageways open into the troughs formed between pairs of mutually inclined surfaces 26, 27. The backface 19A and surfaces 16A and 16B of hub 16 can also be provided with chordally disposed grooves 16G (See FIG. 5) which promote radial oil flow to assist lubrication.

The cam surfaces 24, 25 and 26, 27 of cams 22 and 23 can be surface treated by peening or shot blasting the surface before any subsequent hardening treatment. Typically shot blasting for upto one minute with spring steel cut wire shot, of a length of 0.7 mm and a diameter of 0.7 mm is suitable. This has the effect of creating little oil reservoirs on the cam surfaces.

After case hardening the cam surfaces may be further treated by a salt bath nitro carburizing process. A suitable process is the "Sursulf" process (trade mark of Hydromechanique et Frottement, France).

After nitrocarburizing certain areas (e.g. the back face 19A of the pinion 19 and the cam surfaces) are induction hardened up to a hardness of typically Rockwell 60.

At least one of the end walls 13 and 14 of the housing 11 is provided on its axially outer external surface with an oil pump means such as circumferentially spaced external scoops 72 one of which is shown in dotted outline in FIG. 1. Scoops 72 direct oil from within the surrounding casing to oil passageways 73 formed through the end wall 14. Passageways 73 in turn interconnect with the other lubricating passages described above to provide good lubrication of the differential.

As an alternative to scoops 72 the differential could be provided with a vane-type pump of the type described in the Applicants co-pending application No. PCT/GB93/02137 mounted around and driven from end wall 14 as shown in FIGS. 6 and 7. FIG. 6 shows an alternative two piece end wall 14 encircled by a pump 80 driven from end wall 14.

Pump 80 comprises a non rotatable housing having an inner part 81 and an outer part 82 and an impellor having a central cylindrical band 83 which encompasses tile end wall 14 and vanes 84 which extend radially outwardly from the band at circumferentially spaced locations. The impellor is moulded from rubber or plastics material so that vanes 84 are flexible.

A pick-up pipe 85 which receives oil from within the surrounding casing provides the inlet to pump 80 and also, by its connection with a non-rotating portion of the differential, resists any tendency for the pump housing to rotate.

An exhaust port 86 from the pump housing is connected with an annular collection reservoir 87 from which extend passageways 88 which are the equivalent of passageway 73 in the FIG. 1 construction. Between inlet pipe 85 and exhaust port 86 the cross section of the pump decreases at 87 to produce the change in volume which provides the pumping action. The pump vanes flex, as shown at 84a, when passing through the decreased cross-section portion 87 of the pump.

The cylindrical band portion 83 of the impellor may be a friction grip on end wall 14 or may be positively driven by interengaging formations on the band and end wall or by other fasteners between the band and the end wall.

The pump 80 is designed to fill the differential with oil and maintain a steady flow of oil through the differential on rotation of housing 11. Oil flowing through passageways 88 enters the axially extending passageways in pinion 19 to flow to the cam surfaces 24, 25: 26, 27 and the cam followers 28 and reach the oil volumes 79 radially outboard of the cams 22, 23 via bearings 42. Oil then flows radially inwardly between cams 22, 23 and followers 28 to exit from the differential via grooves 16G in pinion 19, axial oil passageways (not shown) in bore 51 of pinion 19, and helical feed grooves 18A in bores 18 of end walls 13 and 14.

In an alternative differential arrangement the hub 16 acts as the input and the pinion 19 as one of the outlets whilst the gear 12 is eliminated so that the second outlet is taken from that portion of end wall 13 or 14 within bearings B. This provides closely coaxial input and output drives and is particularly suited to certain applications where a high level of compactness is required.

Whilst the differentials described above are particularly useful for the transmissions of engines longitudially mounted in a vehicle, they are also useful for transverse mounted engines or transmissions. The differentials may also be useful for distributing the drive to twin rear drive axles.

We claim:

1. A differential mechanism (10) comprising two output cam members (22,23) rotatable about an axis (A) each said member having a single annular cam surface thereon of undulating form comprising pairs of mutually inclined surfaces (24,25: 26,27) and a plurality of cam followers (28) having end surfaces (29,30: 32,33) engaging the cam surfaces of the output cam members, the arrangement being such that relative contra rotation of said output cam members (22,23) causes the cam followers (28) to slide axially, and an input element (16) engaging the followers which are slidably supported by the input element and moving the followers circumferentially relative to the output cam members, characterised in that the input element (16) engaged with a radially inner portion (36) of each cam follower to move the follower circumferentially relative to the cam output members (22,23), and the cam surfaces (24,25: 26,27) face inwardly (P,P2) towards the axis of rotation (A).

2. A differential mechanism as claimed in claim 1 characterised in that the followers (28) each have a radially inwardly extending drive dog (36) that engages in one of a plurality of axially extending grooves (39) in an outer surface of the input element (16).

3. A differential mechanism as claimed in claim 2 characterised in that circumferential adjacent faces (37) of the dogs (36) are curved and engage like curved surfaces within the grooves (39) of the input element (16).

4. A differential mechanism as claimed in claim 1, characterised in that one output cam surface (24,25) is formed on part (13) of a housing (11,13,14) containing the differential, and the second output cam surface (26,27) is formed on a pinion (19) which is rotatable within the housing.

5. A differential mechanism as claimed in claim 1 characterised in that the angle of inclination (P) of one cam surface (24,25) is different to the angle of inclination (P2) of the other cam surface (26,27).

6. A differential mechanism as claimed in claim 1 characterised in that the cam surface (26,27) on the pinion (19) is biased towards the other cam surface (24,25) by spring means (44) located between an end wall (14) on the housing and the pinion (19).

7. A differential mechanism as claimed in claim 1 characterised in that oil pump means is driven from a component (14) of the differential which rotates during use of the differential to pump oil into the differential.

8. A differential mechanism as claimed in claim 7 characterised in that the pumping means comprises external scoops (72) on the component (14) which rotates connected to oil passages (73) through the component.

9. A differential mechanism as claimed in claim 7 characterised in that the pumping means comprises an oil pump (80) driven by the component (14) which rotates.

10. A differential as claimed in claim 9 characterised in that the oil pump (80) surrounds and is driven from the component (14) which rotates.

11. A differential as claimed in claim 10 characterised in that the oil pump (80) comprises a non-rotatable housing (81,82) containing an impellor (83,84) mounted on an outer surface of the component which rotates.

12. A differential as claim in claim 11 characterised in that the impellor comprises a central annular band (83) which encompasses the outer surface of the component (14) which rotates and a plurality of vanes (84) extending radially outwardly from the band at circumferentially spaced locations thereon.

13. A differential as claimed in claim 11 characterised in that the pump housing (81,82) has an inlet (85) and an outlet (86) and the cross section of housing decreases (87) between the inlet and outlet to produce the pumping action.

14. A differential as claimed in claim 12 wherein the pump vanes (84) are formed from rubber or plastics material and bend as they pass through the decreased cross section (87) of the housing (81,82).

15. A differential as claimed in claim 13 wherein the pump outlet (86) is connected with an annular collection reservoir (87) which encircles the component (14) which rotates, the reservoir being in turn connected with axially extending passageways (88) in the component.

16. A differential as claimed in claim 13 wherein the pump inlet is provided by an inlet pipe (85) which is secured at one end to a non-rotatable component and at the other end to the pump housing (81,82), said inlet pipe thus also serving to prevent rotation of the pump housing during use of the differential.

17. A differential as claimed in claim 9 in which the oil pump (80) delivers oil to at least some of the troughs between pairs of inclined cam surfaces (24,25; 26,27) via axially extend passageways in the cam members (22,23).

18. A differential mechanism as claimed in claim 1 characterised in that the number of cam followers (28) is between eleven cam followers and five cam followers.

* * * * *